March 5, 1968     B. GAYET ET AL     3,372,212

PROCESS FOR PRODUCING DENSIFIED AND ELONGATE BODIES

Filed Nov. 3, 1964     4 Sheets-Sheet 1

United States Patent Office 3,372,212
Patented Mar. 5, 1968

3,372,212
PROCESS FOR PRODUCING DENSIFIED AND
ELONGATE BODIES
Bernard Gayet and Jean Holder, Ballancourt, France,
assignors to Commissariat à l'Energie Atomique, Paris,
France
Filed Nov. 3, 1964, Ser. No. 408,584
Claims priority, application France, Nov. 6, 1963,
952,795
4 Claims. (Cl. 264—.5)

ABSTRACT OF THE DISCLOSURE

Elongate bodies are formed of cylindrical elements having the cross-section of the body with the elements stacked in end to end relationship. The elements are moved through an induction coil to melt the central part of each element and the elements are then cooled bonding the elements together into an elongated body.

The invention relates to a process for producing elongated rods made of a non-insulating material from elements of the material, and to an apparatus for performing such process. The term "non-insulating" will be used herein to denote materials whose electrical resistivity is a few hundred ohms/cm.$^2$/cm. near their melting point.

The invention is of use inter alia with refractory non-insulating materials—i.e., materials having a melting point of at least 1900° C.—and it enables rods of increased compactness to be produced from pastilles formed by compression of such materials in powder form.

The invention is very useful in connection with ceramic nuclear fuel materials. The latter, inter alia uranium dioxide ($UO_2$), have, as a rule, previously been used in the form of fritted pastilles. Unfortunately, this process is costly. Direct densification of the material in a fuel element sheath by vibration and hammering is cheaper, but the grains of powder must be very dense if a satisfactory fuel element is to be provided. An appropriate dioxide can be obtained by arc melting, followed by setting and crushing, but this procedure causes appreciable pollution.

This invention has as one of its objects to provide a very pure material dense enough to be directly densified in a fuel cell can after crushing.

French patent specification 1,358,438 describes a process for melting non-insulating refractory materials by induction, of use for densifying such material by zone melting, wherein the material is given the shape of a substantially cylindrical specimen, and an induction winding disposed around the specimen is energised with a current having a frequency such that the ratio of the radius to the depth of penetration of the current into the body is at least 1.5, preferably from 1.5 to 3, near the melting point. In one form of this process, the specimen is given the form of a cylindrical rod which is moved through the heating winding to cause compacting by zone melting of the central part of the rod, the side part thereof forming a solid "shell" which is not melted. This process has the disadvantage of being intermittent, and separate heating means, such as a susceptor, must be provided since each rod has to be heated to a temperature at which its electrical resistivity is low enough before passing through the winding.

It is an object of the invention to provide a continuous process for producing elongate rods from pastilles having the same cross-section as the rod but being shorter than the latter. The invention accordingly provides a process for producing an elongate body of a material, comprising the steps of forming cylindrical elements of said material conforming to the cross-section of said body, stacking said bodies in end to end relation, moving said stack first through an induction coil fed with electrical current of such frequency and intensity that the currents induced in said material increase the temperature of the central part only of said stack beyond its melting point and then to a cooling zone for bonding said elements.

All these features will be better understood from the following description of an exemplary non-limitative embodiment of the invention, reference being made to the accompanying drawings wherein.

Figure 1:
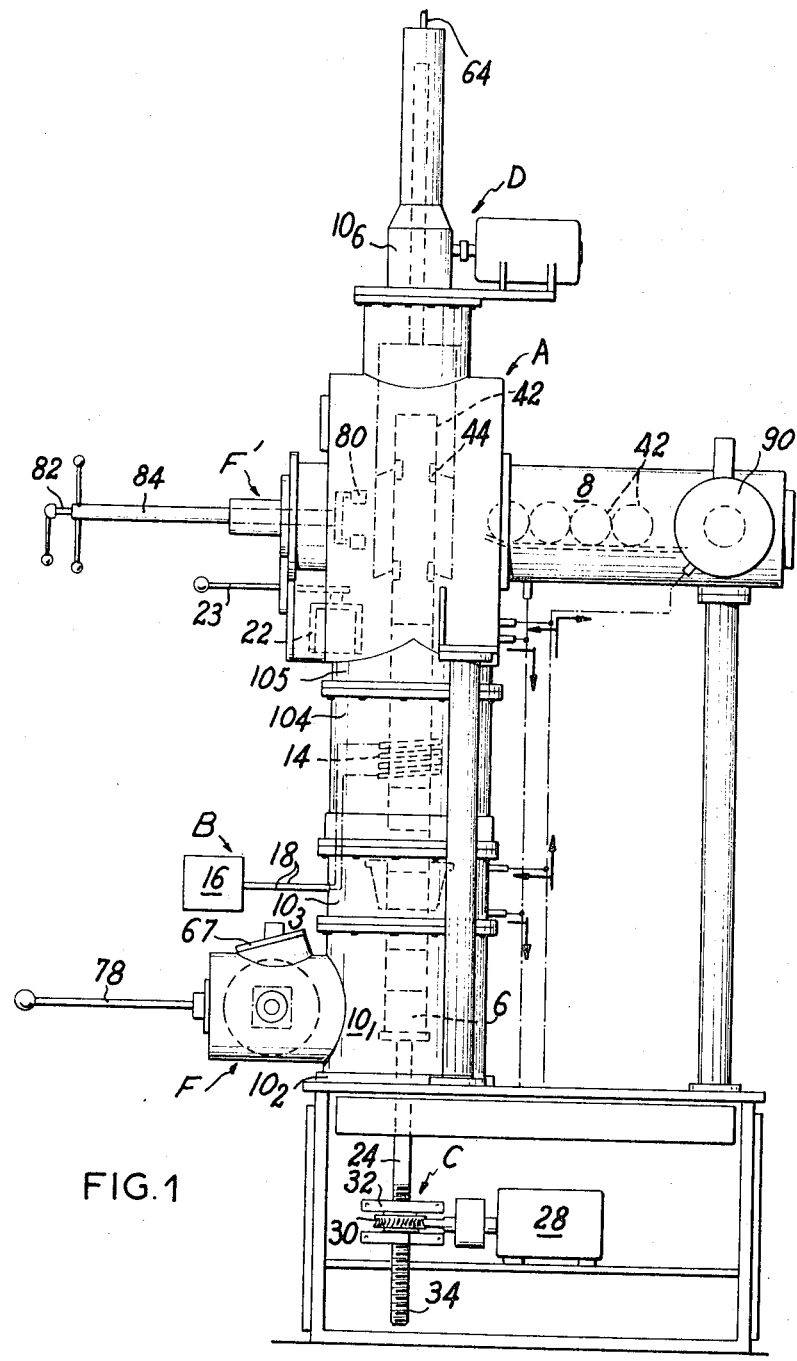
FIGURE 1 is a very diagrammatic side elevation of an oven for carrying out the invention, for producing densified uranium dioxide ($UO_2$) rods from cylindrical $UO_2$ pastilles.

The oven shown in FIG. 1 by way of non-limitative example is for treating $UO_2$ pastilles 6 prepared by compression of powder; advantageously, the diameter and height of the pastilles 6 is from 30 to 100 mm. The oven comprises a hermetic chamber 7 bounded by a jacket A formed by a vertical-axis column and by a horizontal-axis top casing 8. The column comprises a number of separate elements assembled by means, such as nuts and bolts, which are not shown. The column includes a metal cap $10_1$ closed by an end member $10_2$, a ring $10_3$, a ring $10_4$ of quartz or of "Pyrex" glass ("Pyrex" is a T.M.) and a top cap $10_5$ having an extension $10_6$; the various caps and rings can be made preferably of stainless steel or light alloy. The member $10_3$ and the lower portion of member $10_5$ are double-walled, as can be gathered from FIG. 2, and cooling water flows in the annular between-walls spaces as diagrammatically indicated by chain-dotted lines in FIG. 1, the water entering the spaces or chambers through tubes $12_1$ and leaving through tubes $12_2$, as can be gathered from FIGS. 2 and 4; a protection grid (FIG. 2) is located around ring $10_4$.

The oven also comprises a heating system B, a mechanism C for loading the pastilles 6, a mechanism D for drawing the densified rods, and introducing and removing mechanisms F, F' to be described hereinafter.

Figure 2:
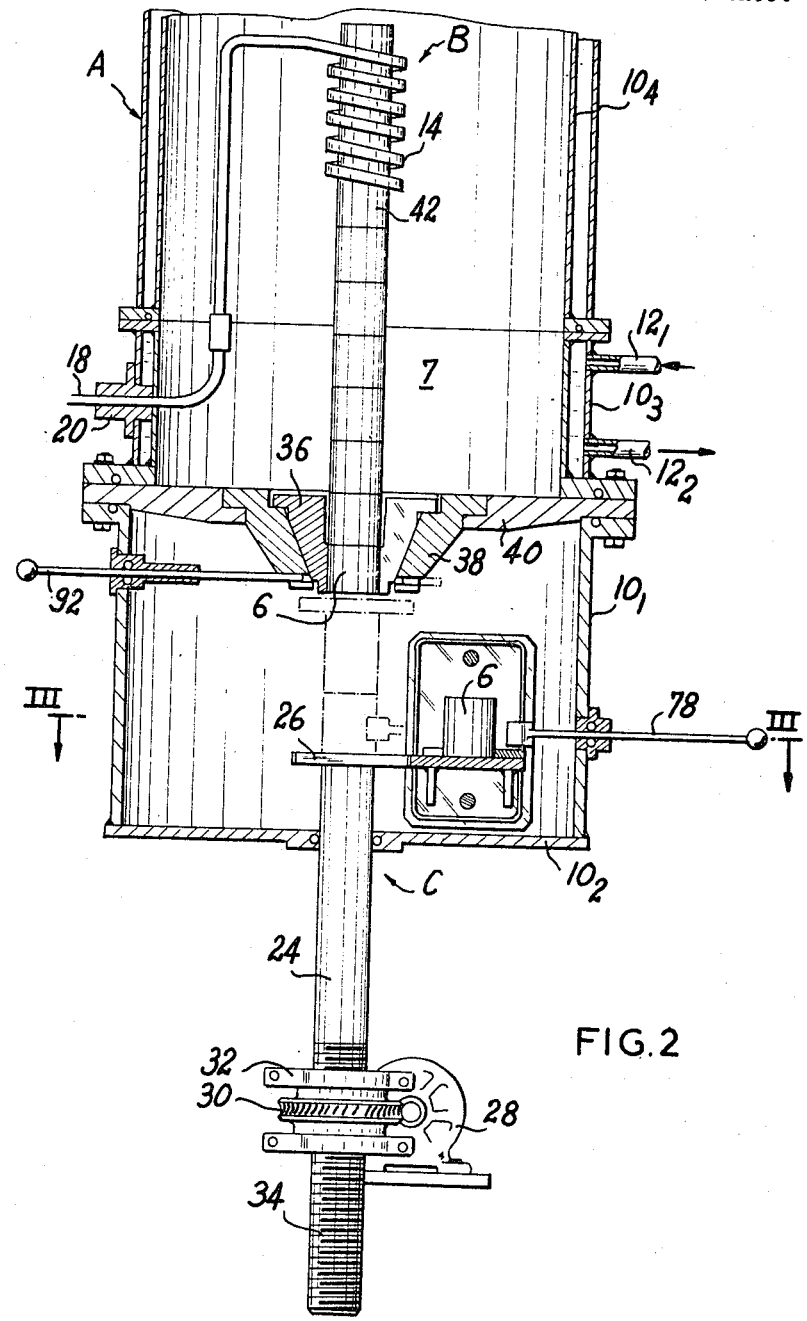
FIGURE 2 is a detailed view of the mechanism for introducing and loading the pastilles, the view being in section in a plane passing through the vertical axis of the oven.

The heating device B comprises a vertical-axis winding 14 disposed in the chamber 7 at the level of the ring $10_4$ of quartz or "Pyrex." The winding 14 is connected to a high-frequency oscillator 16 by wiring 18 which can be seen in FIGS. 1 and 2 and which extends through an insulating hermetic lead-through 20 (visible in FIG. 2) in the wall of the ring $10_3$. The heating system B also comprises a "susceptor" sleeve 22, made of a material, such as graphite, which conducts electricity at ordinary temperatures and a rod 23 for moving the susceptor 22, the rod 23 extending through the wall of the cap $10_5$. Via the rod 23, the susceptor can be moved from the normal operating position shown in FIG. 1 to a starting position in which it covers the top pastille which is at the level of the heating winding 15.

The charging mechanism C visible in FIGS. 1 and 2 moves the pastilles 6 vertically upwards. The mechanism C comprises a rod 24 which is disposed in extension of the axis of the winding 14 and which slides in sealing-tight manner through the end member $10_2$; the rod 24 has a platform 26 whose lowest position is shown in solid lines and whose highest position is shown in chain-dotted lines in FIG. 2. The rod 24 can be moved vertically by a motor 28 which drives through reduction gearing a toothed ring 30 which a collar 32 prevents from shifting; the ring 30 is screwed on to a terminal screwthreaded part 34 of the rod 24, so that rotation of the ring 30 displaces the rod 24.

The mechanism C also comprises a non-return device which is shown in FIG. 2 and which prevents pastilles 6 which have been raised by the platform 18 from dropping back. The non-return device comprises a number of jaws 36 slidable in a cone 38 borne by a disc 40 clamped between the members $10_1$ and $10_3$. When thrust upwards by the platform 26, the jaws 36 can be separated and raised by the rising pastilles 6 so that the same can pass by, but since the jaws tend to slide down by their own weight, they clamp the pastilles and retain them by friction when the platform 26 ceases to support the pastilles 6.

Figure 4:
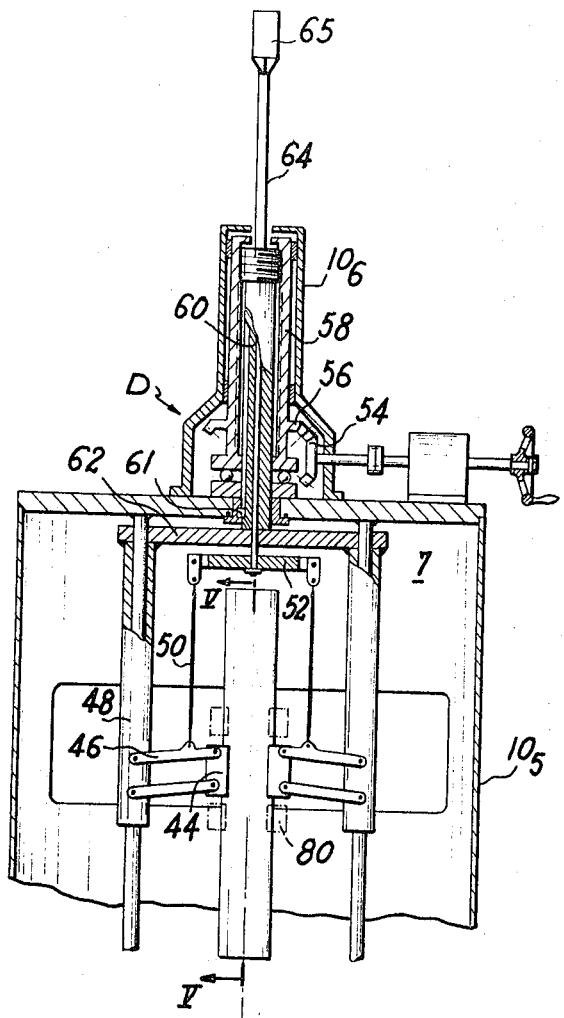
FIGURE 4 is a detailed view of the mechanism for drawing the densified $UO_2$ rods, the view being in section along a plane passing through the vertical axis of the oven.
Figure 4:
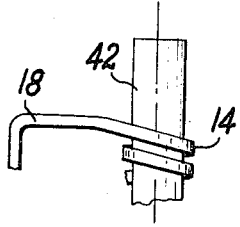

The rods 42 into which the pastilles 6 are formed are drawn by a mechanism D shown diagrammatically in FIGS. 1 and 4 and mainly comprising two clamping members 44 and elements for opening and vertically moving the same. Such elements comprise for each jaw two links 46 articulated to a vertical column 48 and a vertical hanger 50 connected to the top link. The hangers 50 are connected to a beam 52 and the columns 48 are connected to a disc 62. As will be apparent, a relative vertical movement of the rocker 52 and columns 48 opens or closes the jaws 44, whereas movement of the columns and rocker together moves the rod, the jaws being kept clamped on the rod.

Overall control of the rocker and columns is by a mechanism which is, with advantage, synchronised with the motor 28 and which comprises a pinion 54 driving a toothed ring 56 mounted on a sleeve 58 in screwthreaded engagement with a shaft 60 and connected to an electro-magnet 65 secured to the disc 62 and prevented from rotating by splining 61, so that rotation of the sleeve 58 causes a vertical movement of the shaft 60. Gaskets are of course provided but not shown. A rod 64 slidable in the shaft 60 controls vertical movement of the rocker 52 relatively to the disc or blade 62 to open and close the jaws 44.

Figure 3:
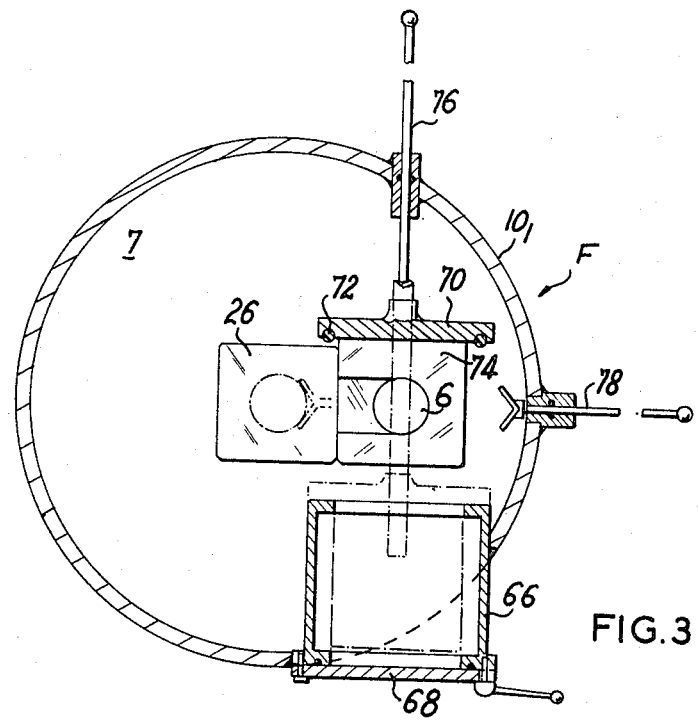
FIGURE 3 is a vertical section taken along the line III—III of FIGURE 2.

The pastille-introducing mechanism F is shown diagrammatically in FIGS. 1–3 and comprises an airlock, for maintaining a controlled atmosphere in the chamber 7 during operation, and elements, operated from outside the enclosure A, for moving the pastilles. The airlock is shown in FIG. 3 and comprises a stationary casing 66 rigidly secured to the member $10_1$. The introduction of the pastilles can be supervised through a hatch 67. The airlock has an outer door 68 operated directly from the outside, and an inner door, in the form of an ordinary plate 70 which can move towards and away from the casing 66 and which has a ring gasket 72. The plate 70 also bears a disc 74 forming the floor of the airlock. Through the agency of a rod 76 which extends through a sealing gasket in the member $10_1$, the plate 70 can be moved between an outside position in which the airlock is closed (position shown in chain-dotted lines in FIG. 3) and an inner position (shown in solid lines) in which the plate 70 is opposite a pusher 78 which, if the platform 26 is at the same level as the plate 70, can transfer a pastille from one to the other.

Figure 5:
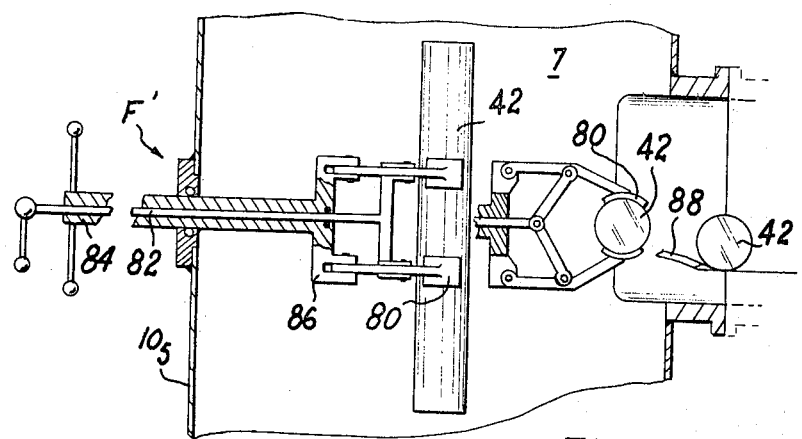
FIGURE 5 is a detailed view of the rod-discharging mechanism, the view being in section along the plane passing through the axis of the oven and perpendicular to the plane of FIG. 4 (along the line V—V of FIG. 4).

When a bar 42 of a length corresponding to the size of the casing 8 has been formed by solidarisation of the pastilles, the removal mechanism F' which is shown diagrammatically in FIG. 1 and in greater detail in FIG. 5 deals with such bar. In the oven shown in the drawings, the bar leaves in the horizontal direction and so its orientation must be changed. Of course, if the casing 8 were modified a mechanism F' could be used which does not provide this alteration in orientation.

The mechanism F' comprises jaws 80 which are shown in chain-dotted lines in FIG. 4 and whose opening and closing movements are controlled in a similar way to those of the jaws 44; the relative movement of an actuating rod 82 and of a shaft 84 terminating in a rocker 86 to which the jaws 80 are articulated controls the opening and closing of the jaws 80.

FIG. 5 shows the mechanism F' in engagement with a bar 42 which is still disposed axially of the oven—i.e., in the position in which the mechanism D maintains it (left-hand and central part of the drawing). FIG. 5 also shows the mechanism F' after rotation through one-quarter of a revolution (right-hand part of FIG. 5). The mechanism F' also comprises a reception hopper 88 extending into an airlock 90 which, being similar to the airlock of the mechanism F', will not be described in detail.

A description will now be given of how the process according to the invention may be carried into effect with reference to operation of the oven illustrated. In this example, the rods are formed from pastilles in shape resembling cylinders of revolution 50 mm. in diameter and 50 mm. long, the pastilles being formed by compression of $UO_2$ powder and having a density of approximately 7. With the enclosure A open, sufficient pastilles to ensure that the top pastille reaches the height of the winding 14 are stacked on the platform 26, whereafter the enclosure A is closed and the air therein is replaced by hydrogen at a slight positive pressure, for instance, 50 g./cm.$^2$, relatively to atmosphere, whereafter a flushing hydrogen flow is maintained in the enclosure A. The graphite susceptor 22 is then placed above the top pastille, whereafter the winding 14 is energised with a current of appropriate frequency and strength. The temperature of the graphite and of the pastille 6 surrounded by the susceptor 22 rises progressively. When the temperature of the graphite has reached 1300° C., the susceptor 22 is removed, preferably with an interruption of the energisation, so that the temperature of the $UO_2$ drops slightly. The energisation is then restored if it has previously been interrupted. In the particular case being considered here, the oscillator has a power of some 20 kw. and a frequency of 3.5 mc./s. but more generally the frequency is chosen within the range given in the above mentioned patent application to which reference can be had. The temperature of the $UO_2$ increases rapidly. When the central part of the top pastille 6 melts, the raising mechanism is then operated to raise the pastille stack at a rate of some 10 mm./mn. in the present case. More generally, this rate is from 1 to 40 mm./mn.

When the vertical movement of the stack is equal to the height of a single pastille 6, the mechanism F must introduce a fresh pastille 6 into the enclosure A below the stack. To this end, the platform 26 is returned to its bottom position (FIG. 2), the stack being held by the jaws 36. The rod 76 is pushed in enough for the ring gasket 72 to make a hermetic seal with the casing 66. The outer door 68 is then opened, a pastille 6 is placed on the disc 74, and the door 68 is reclosed after the atmosphere has been changed. The rod 76 is returned to the position shown in FIG. 3, whereafter the rod 78 is pushed in (chain-dotted line position in FIG. 3) to transfer the pastille 6 from the disc 74 to the platform 26. The mechanism C then resumes its rising movement, and this cycle of operations is thereafter repeated as often as required. The top pastille, once it has risen high enough into the cooling zone bounded by the water-cooled member $10_5$, is engaged by the jaws 44 which thereafter guide it.

While the winding 14 continues to be energised, the central portion of the pastilles passing through the winding is melted in a zone melting process; more particularly, when the contact region between two pastilles disposed one above another passes through the winding, the central portion of such region melts. When such region subsequently sets, the two pastilles are welded together by their central part. The lateral surface of the pastilles stays solid to form as it were a "shell" or crucible for the liquefied central part. Despite breaks in the shell between consecutive pastilles, there is no liquid leakage in the contact area between two consecutive pastilles, for the heat gradient between the outside and the inside of the pastilles is so great that any leaks set immediately.

When a sufficient number of pastilles have entered the winding 14, the current flowing therethrough is limited—and therefore the heating provided by the winding 14 is also limited—whenever a contact region between two pastilles passes through the winding. This feature obviates melting of such region although the same is maintained at a higher temperature than the preheat temperature. Once this region has left the winding, heating at full power is resumed. The welded-together pastilles therefore form a rod or bar or the like 42 which, in the example shown, comprises five pastilles. When the rod has moved far enough up and has cooled sufficiently, it is taken over by the mechanism F′, separated from the jaws 44 and placed on a water-cooled hopper 88. When completely cooled the rod 42 leaves the oven via the lock 90.

The rods 42 thus obtained are formed by a dense fritted (unmelted) sheath which contains an inner part formed by large separate $UO_2$ monocrystals; the volume of each monocrystal is about 1 cm.$^3$ and its density is about 10.93. The rods are then crushed (after the end portions have been cut away in some cases) and screened to obtain a powder of appropriate grain size. This powder is compacted by vibration in a metal sheath to give fuel elements filled with very dense $UO_2$.

The system hereinbefore described is very flexible in use and is safe. More particularly, if the top part develops a fault, the mechanism F can unload the oven, to which end a fork 92 is provided to release the non-return system shown in FIG. 2.

The process and apparatus hereinbefore described can of course be varied in several ways. More particularly, the vertical movement of the pastille stack can be downwards instead of upwards although an upwards movement is preferable. The cylindrical elements need not necessarily be pastille-shaped and can, for instance, take the form of a rod whose height is considerably greater than its diameter.

We claim:
1. A process for producing an elongate body of a refractory material, comprising the steps of compacting a powder of said material into elements whose cross-section conforms to the cross-section of said body, stacking said elements in end to end relation, moving said stack first through an induction coil fed with electrical current of such frequently and intensity that the currents induced in said material increase the temperature of the central part only of said stack beyond its melting point and then to a cooling zone for bonding said elements and densifying said material.

2. A process for forming an elongate body of a non-insulating refractory material from elements of the same material having the same cross-section as the required body but being shorter than the latter, said process comprising the steps of forming a vertical stack of the elements, preheating the top element of the stack to a desired temperature, moving the stack vertically so that all the elements thereof pass seriatim first through an induction coil energised by an electric current having a frequency and intensity such that the currents induced in the elements raise the temperature of the central part of the stack above the melting point of the material while the outer part of the stack remains solid, and secondly through a cooling zone in which the melted parts of the elements solidify whereby consecutive elements are bonded and said material is densified.

3. A process as set forth in claim 2, wherein the intensity of the said current is reduced when the contacting parts of some of the elements pass through the induction coil, to limit the length of the elongate bodies.

4. A process as set forth in claim 1, wherein a member having a reduced electrical resistance is temporarily placed around the top element to preheat the same.

References Cited
UNITED STATES PATENTS

| | | | |
|---|---|---|---|
| 3,075,573 | 1/1963 | Piazze | 156—513 |
| 3,142,533 | 7/1964 | Accary et al. | 264—.5 |
| 3,272,957 | 9/1966 | Koesling et al. | 219—10.69 |

L. DEWAYNE RUTLEDGE, *Primary Examiner.*

DOUGLAS J. DRUMMOND, *Examiner.*